United States Patent Office 3,535,881
Patented Oct. 27, 1970

3,535,881
COMBINATION ROCKET AND RAM JET ENGINE
Johannes Schubert, Unterhaching, Germany, assignor to Bolkow Gesellschaft mit beschrankter Haftung, Ottobrunn, near Munich, Germany
Filed Oct. 11, 1968, Ser. No. 766,729
Claims priority, application Germany, Oct. 18, 1967, 1,626,069
Int. Cl. F02k 7/10, 9/02, 9/06
U.S. Cl. 60—245
8 Claims

ABSTRACT OF THE DISCLOSURE

A combination engine includes a portion operating as a rocket engine for launching the device and a portion operating as a ram jet engine for propelling the device during cruising. The device includes a main combustion chamber which, for example, is lined with a solid oxidizer-rich component and oriented to discharge through a thrust nozzle to the rear of a device such as a missile. A solid launching and cruising rocket fuel is carried in an auxiliary combustion chamber and the fuel-rich gases which are partially burned therein are directed through a gas duct into the main combustion chamber for further combustion with the oxidizer and for discharge through the thrust nozzle. The launching and cruising rocket fuel advantageously includes means for insuring a fast burning during the launching phase in order to generate a higher amount of thrust gases and a slower burning during the remaining phase of operation. For this purpose, the initial burner may be in the form of an inner star-shaped burner. The large amount of inner exposed surface permits a fast burn-off of the charge during the launching phase, but the remaining portion of the charge is arranged for end ignition providing a relatively slower burn-off. In another embodiment, the charge may be made up of a fast burning portion for launching the device and a slower burning portion to operate during crusing. The device also includes initially closed air flaps for the intake of air into the main combustion chamber after launching to provide combustion air for further combustion of the gas generated by the burning of the solid fuel in the auxiliary combustion chamber.

SUMMARY OF THE INVENTION

This invention relates, in general, to the construction of thrust-type engines and, in particular, to a new and useful combination engine having a ram jet engine portion and a rocket engine portion.

It is already known to provide an engine which comprises a rocket engine and a ram jet engine having a common combustion chamber for both types of operation and employing a thrust nozzle of invariable geometry. During the launching phase, liquid fuel and liquid oxygen are introduced into the common combustion chamber and the air supply for the ram jet engine is blocked. During ram jet operation, the liquid oxygen supply is suppressed and the common combustion chamber is supplied with ram air having oxygen which reacts with the atomized fuel component. The blocking of the ram jet cycle with respect to the common combustion chamber is effected by means of flaps which are automatically closed by the pressure prevailing during the rocket operation in the combustion chamber and which are opened during the ram jet operation by the dynamic pressure of the intake air. It is also known ot provide a combination engine of this type having a solid oxidizer arranged as a launching rocket composition in the form of a hollow burner for accelerating the missile during launching. This solid oxidizer is arranged in a main combusion chamber ahead of the thrust nozzle and it blocks the air inlet of the ram jet chamber during the launching phase. In front of the main combustion chamber is arranged an auxiliary combustion chamber in which the combustible gases are produced by means of an injected liquid fuel, which reacts during the launching phase with the solid oxidizer and reacts during the cruising with the oxygen of the ram air.

Rocket engines operated with liquid propellants require great technical expenditures in the form of attachments and auxiliary devices such as propellant tanks, propellant pumps, pressure gas conveyor means and propellant regulators for the correct dosing of the respective injections in order to achieve a favorable efficiency of the combustion chamber. Combination engines of the type described above require additional control and regulating means in order to obtain good efficiency during the operating phases. The engines must produce larger amounts of fuel during rocket operation compared with the ram jet operation in order to achieve an economical combustion chamber pressure with equal nozzle thrust geometry. This geometry is defined in the ram jet operation by the air through-put resulting in a higher mass through-put even with lower fuel gas production. The additional control and regulating means cause not only higher cost, but they also result in a greater overall weight and require additional installation space.

In accordance with the present invention, there is provided a combination engine having means for operating selectively under the rocket and ram jet principles. The engine is simple in construction and inexpensive, safe and of lightweight design and requires little installation space. In addition, the engine of the invention operates with favorable combustion chamber efficiency at constant thrust nozzle geometry during both operating phases, that is, the launching and the cruising phase.

In accordance with the invention, a fuel rich launching cruising propellant component in the form of a solid rocket fuel composition includes a portion which burns rapidly for the launching phase and is designed as an inner or tubular burner or an end burner of high burning rate. In addition, the fuel composition includes a part designed for relatively fast burning during the cruising phase and this may, for example, be a front burner having an exposed area or composition which produces the desired slower cruising burning rate. A faster burning of the launching part, for example, is obtained by the construction of the portion thereof designated for launching in the form of an inner star-shaped burner having a large burning area permitting faster burn-off. The arrangement and construction is such that a functionally simple, compact and slim design of missile is possible. The construction is such that a very great amount of these missiles may be mass produced without becoming subject to shipping and storage difficulties.

Accordingly, it is an object of the invention to provide a combination engine which includes a rocket engine portion carrying a solid fuel propellant which discharges into a main combustion chamber which is advantageously either lined with a solid oxidizer or provided with means for delivering an oxidizer such as air to the combustion chamber, and wherein the solid fuel includes means for burning a portion thereof at a relatively fast rate for launching the vehicle and a remaining portion burning at a slower rate for cruising.

A further object of the invention is to provide a combination rocket and ram jet engine for use, for example, in a flying body or missile which includes an inner portion dividing an auxiliary combustion chamber having a solid fuel propellant charge therein and an after combustion chamber or main combustion chamber which is advantageously lined with a solid oxidizer and is arranged to receive the gases generated from the solid charge of the pre-combustion chamber and to discharge them through a thrust nozzle after further burning, the after combustion chamber having flaps permitting the intake of air after the launching phase has terminated and the solid charge being constructed so that a portion thereof burns rapidly for the initial launching phase of operation and a remaining portion burns less rapidly for the cruising phase.

A further object of the invention is to provide a combination engine which is simple in design, rugged in construction and economical to manufacure.

The various features of novelty which characterize the invention are pointed out with particularity in the claims annexed to and forming a part of this specification. For a better understanding of this invention, its operating advantages and specific objects attained by its use, reference should be had to the accompanying drawings and descriptive matter in which there are illustrated and described embodiments of the invention.

DETAILED DESCRIPTION OF THE PREFERRED EMBODIMENTS

Figure 1:
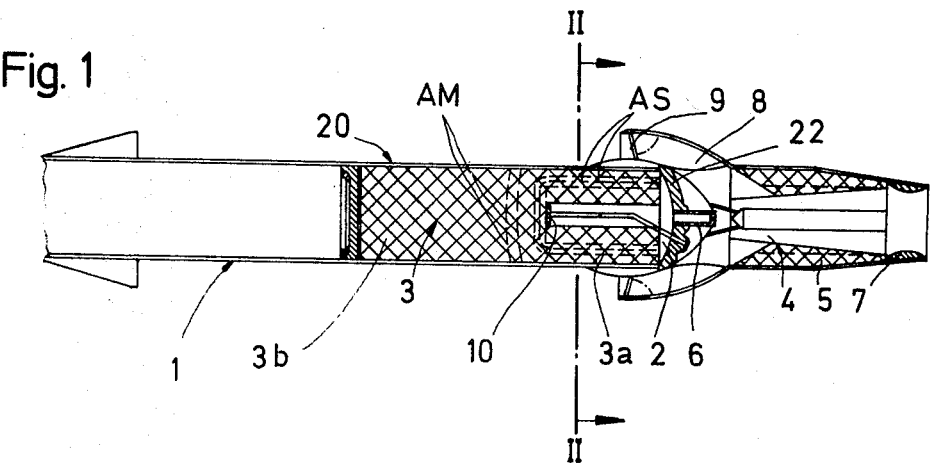
FIG. 1 is an axial sectional view of a missile having a combination engine constructed in accordance with the invention.
Figure 2:
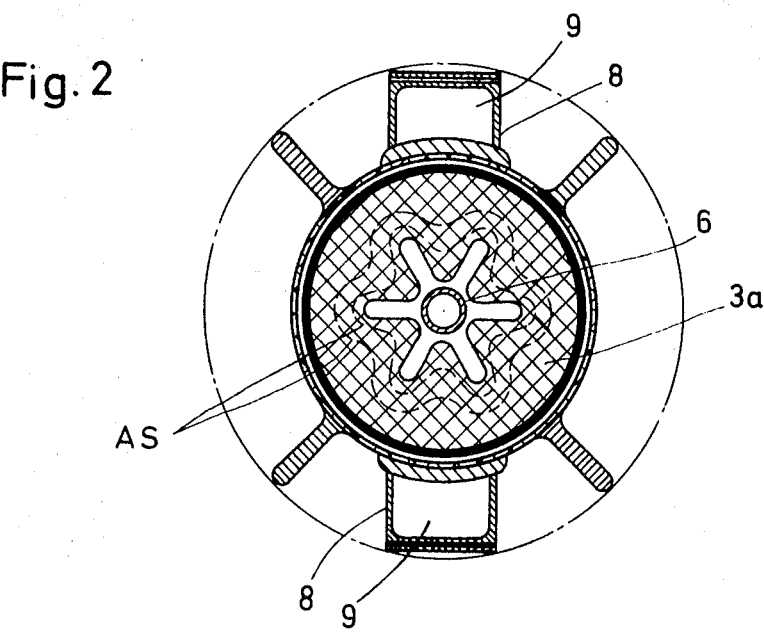
FIG. 2 is a section taken along the line II—II of FIG. 1, but on a greater scale.

Referring to the drawings, in particular, the invention embodied therein in FIGS. 1 and 2 comprises a combination engine generally designated 20 which is carried on the after end of a missile generally designated 1. The combination engine 1 comprises an auxiliary combustion chamber 2 which contains a solid fuel-rich launching cruising rocket composition component 3. A main combustion chamber 4 is lined with a solid oxidizer as a launching rocket composition component 5 and which is advantageously in the form of a star-shaped inner burner. A gas duct 6 extends through a partition wall 22 and provides a communication between the auxiliary combustion chamber 2 and the main combustion chamber 4. The main combustion chamber 4 leads outwardly and rearwardly through a thrust nozzle 7 of invariable or fixed geometry.

The engine 20 also includes forwardly diverging flaps 8 which extend into the air stream surrounding the missile 1 and define oppositely arranged inlet ducts 8 having shut-off flaps 9.

In the embodiment of FIGS. 1 and 2, the launching-cruising rocket composition fuel component 3 is formed of a launching portion 3a and a cruising portion 3b. The launching portion 3a provides a faster burning portion inasmuch as it is formed as a star-shaped inner burner having a relatively large-sized area for relatively rapid burn-off. The cruising part is provided with an end face AM which burns off in the form of a front burner.

The operation of the device is as follows: The launching-cruising rocket composition component 3 and its launching part 3a is ignited by an ignition device 10 which is mounted in a partition wall 22 and extends downwardly into the hollow portion of the launching phase 3a. The burning of the launching-cruising rocket composition component 3 takes place during the launching phase when the air inlets 8 are closed by the closing flaps 9. Burning takes place along the star-shaped surfaces as during the launching phase. During the cruising phase, the burning will be limited to the cruising part 3b and will take place inwardly on the surface AM. Because of the geometry of the inner phase 3b and the outer launching phase 3a, a substantially higher fuel gas production is achieved during the launching portion of operation. The fuel-rich gases will flow from the auxiliary chamber through the gas duct 6 and into the main chamber 4 where they react with the oxidizer and the oxygen rich launching composition component 5. The production of thrust gases by means of the launching part 3a and the launching rocket composition component is quantitatively so proportioned that an effective favorable rocket operation is achieved with a given constant thrust nozzle geometry.

After the launching phase, the shut-off flaps 9 are either forceably opened or they are automatically opened by the dynamic pressure of the surrounding air which becomes effective by the pressure drop in the main combustion chamber 4 after the launching rocket composition 5 has completely burned out. Then oxygen is added through the ram air to the combustible gases still entering the main combustion chamber through the gas pipe 6. The amount of the combustion gases which are supplied through the pipe 6 will become diminished after the consumption of the cruising portion 3b.

Figure 3:
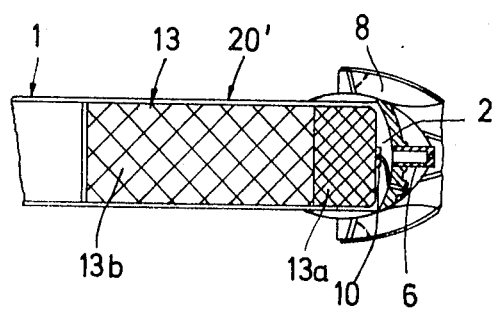
FIG. 3 is a partial axial sectional view similar to FIG. 1, but showing another embodiment of the engine.

In the embodiment indicated in FIG. 3, a combination engine 20′ includes a fuel-rich launching-crushing rocket composition component 13 including two chemically different solid propellants such as a faster burning launching rocket composition 13a with relatively high gas production and a slower burning cruising rocket composition 13b having a lower gas production per unit of time. In other respects, the engine 20′ is similar to the engine 20.

What is claimed is:

1. A combination rocket and ram jet engine, comprising means defining a main combustion chamber having a thrust nozzle discharge, a solid oxidizer launching composition associated with said main combustion chamber for providing an oxidizer in said main combustion chamber during launching, means defining an auxiliary combustion chamber having a discharge connected into said main combustion chamber, said main combustion chamber operating as a ram jet having auxiliary ram-air inlet means normally closed during launching but openable after launching for cruising, and a fuel-rich launching-cruising rocket composition component in said auxiliary combustion chamber having a first portion with means for the rapid burning of fuel-rich gases and for discharging the fuel-rich gases into said main combustion chamber for reaction with the oxygen gases of said solid oxidizer during launching and having a second portion with means for producing the slower burning of fuel-rich gases for discharge into said main combustion chamber for reaction with oxygen from the inlet during cruising.

2. A combination rocket and ram jet engine, according to claim 1, wherein said launching-cruising rocket composition first part comprises an inner burner formation having an interior burn-off area, said second part comprising a front burner.

3. A combination rocket and ram jet engine, according to claim 2, wherein said first part includes an interior star-shaped inner burner.

4. A combination rocket and ram jet engine, according to claim 1, wherein said fuel-rich launching-cruising rocket composition first part comprises a faster burning rocket composition having a higher gas production than said second part which has a slower burning cruising rocket composition with a lower gas production per unit of time.

5. A combination rocket and ram jet engine, according to claim 1, wherein said solid oxidizer is disposed against the walls of said main combustion chamber and includes an inner star-shaped portion exposed on the interior of said combustion chamber for reaction with the fuel-rich gases generated in said auxiliary combustion chamber.

6. A combination rocket and ram jet engine, according to claim 1, including a gas duct extending from an auxiliary combustion chamber discharge to said main combustion chamber, and an ignition device engaged with said first portion of said fuel-rich launching-cruising rocket composition.

7. A combination rocket and ram jet engine, according to claim 6, wherein said first portion of fuel-rich launching-cruising rocket composition is formed as a star-shaped burner having a hollow central portion of star-shaped configuration, said ignition device extending downwardly through the hollow portion of said first portion to a location adjacent said second portion.

8. A combination rocket and ram jet engine comprising means defining a main combustion chamber having a thrust nozzle discharge, a tubular solid oxidizer launching composition arranged around said main combustion chamber and providing an oxidizer in said main combustion chamber during launching, means defining an auxiliary combustion chamber having a discharge connected into said main combustion chamber, said main combustion chamber operating as a ram jet having auxiliary ram-air inlet means normally closed during launching but openable after launching for cruising, and a fuel-rich launching-cruising rocket composition component in said auxiliary combustion chamber having a first portion with an exposed interior wall along its length forming a rapid burning large surface for the rapid burning of fuel-rich gases and for discharging the fuel-rich gases into said main combustion chamber for reaction with the oxygen gases of said solid oxidizer during launching and having a second portion located behind said first portion and having only an exposed end face with a relatively small burning area designed as an end burner for producing the slower burning of fuel-rich gases for discharging to said main combustion chamber for reaction with oxygen from the inlet during cruising.

References Cited

UNITED STATES PATENTS

| 2,716,329 | 8/1955 | Lunger | 60—261 XR |
| 2,799,987 | 7/1957 | Chandler | 60—245 |
| 2,998,703 | 9/1961 | Badders | 60—251 XR |
| 3,159,104 | 12/1964 | Hodgson | 60—251 XR |
| 3,173,249 | 3/1965 | Wiggins | 60—245 |
| 3,350,887 | 11/1967 | Leunig et al. | 60—251 |
| 3,421,323 | 1/1969 | Bennett | 60—251 XR |

CARLTON R. CROYLE, Primary Examiner

60—251, 270